May 11, 1965 A. C. JACOBAEUS 3,183,306

EXCHANGE FOR AUTOMATIC DATA TRANSMISSION IN TELEPHONE SYSTEMS

Filed Nov. 15, 1960

INVENTOR
ANTON CHRISTIAN JACOBAEUS
BY Hane and Nydick
ATTORNEYS 3,183,306
United States Patent Office
Patented May 11, 1965

3,183,306

EXCHANGE FOR AUTOMATIC DATA TRANSMISSION IN TELEPHONE SYSTEMS

Anton Christian Jacobaeus, Stockholm, Sweden, assignor to Telefonaktiebolaget L M Ericsson, Stockholm, Sweden, a corporation of Sweden Filed Nov. 15, 1960, Ser. No. 69,375
Claims priority, application Sweden, Oct. 10, 1960, 9,680/60
1 Claim. (Cl. 179—2)

This invention relates to automatic telephone exchanges and refers to a circuit arrangement of communications through speech channels, especially carrier frequency channels, which are intended to conduct voice communication and signals for data transmission, the communications being set up by means of selecting means, which are set by a marker, under the control of registers. With data transmission, voice frequency signals consisting of voice frequency combinations are sent very rapidly, that is, the voice frequency signals have short time intervals, whereby distortions of the voice frequency currents can distort the signals. Thus there are higher requirements on freedom from phase distortion for data transmission than for transmission of speech currents.

Until now data transmission is used in telephone channels to so small an extent that it is economically burdensome to provide the carrier frequency equipments with correcting networks, which are connected and disconnected from case to case. The purpose of this invention is to adapt the communications to data transmission with normal carrier frequency equipments and by means of the normal selecting means of the telephone exchanges. This object is attained by means of a number of correcting networks which are intended for correction of phase distortion and the input side and the output side of which are connected, separately, to line multiples for the selecting means, and by means of registering means in the registers which receive direction determining signals for connecting calls to the speech channels, and also a signal, which indicates whether the communication refers to data transmission or to telephone speeches. There are also provided identifying means, which indicate the calling channel (telephone line or carrier frequency channel on a line or in a radio relay link) upon the connection of each communication, and cooperate so that a register is connected to the calling channel and receives the said signals and transmits these to the marker, while the identifying means indicate the calling channel, whereupon the marker, in case the communication refers to data transmission, selects a disengaged speech channel, and a disengaged correcting network adapted for correction of the phase distortion with data transmission in the selected speech channel and thereafter connects the calling channel to the input side of the correcting network and the output side of the correcting network to the selected speech channel through said selecting means.

The invention will be further described with reference to the attached drawing, FIGS. 1–2.

Figure 1:
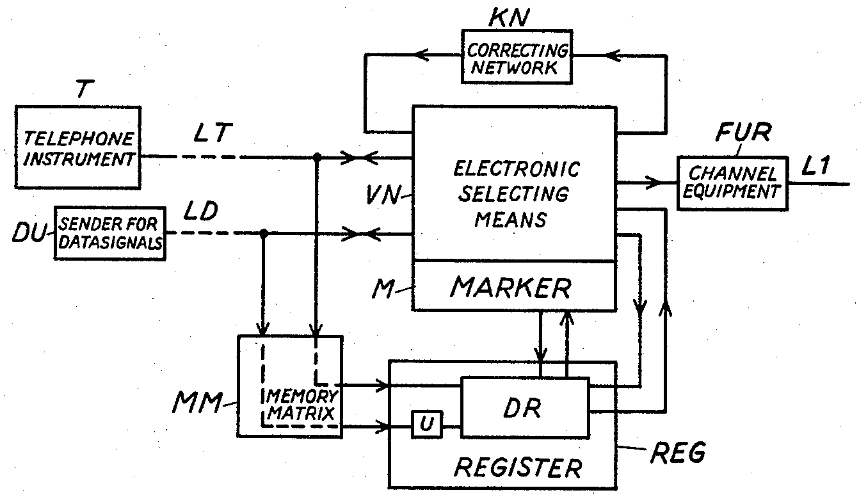
FIG. 1 shows the application of the invention to a telephone exchange having electronic selecting means.

In FIG. 1 LT and LD are telephone lines and L1 is a carrier frequency line or a radio relay link with a carrier frequency equipment for a speech channel FUR. The line LT connects a telephone instrument T, while the line LD connects a sender for data signals DU with the telephone exchange. The electronic selecting means is indicated by VN and is combined with a marker M and a number of registers REG and memory matrixes MM for at least calling signals from the lines LT and LD. By KN is designated a correcting network for phase distortion. Different correcting networks for different purposes and different speech channels are presupposed. The lines LT and LD and the channel equipment FUR are connected to the line multiple of the selecting means VN. Both sides of each correcting network KN are connected in the line multiples of the selecting means VN respectively GA–GD.

Upon calling from one of the lines LT and LD the call is marked in MM. A register REG is selected and is connected through the selecting means VN to the calling line. At the same time, the numbers or the signals of the calling line, which indicate its position in the line multiple of VN, are transmitted to the register and are registered in a registering means DR. If the call is coming from the line LD, also a registering means U in the register REG will be operated, besides the registering means DR. The register receives after this signals from the calling line, which indicate a called instrument. Here it is supposed that a communication shall be connected to this through the selecting means VN and through the speech channel equipment FUR. If the registering means U indicates that the call comes from the line LD and thus refers to data transmission, the marker M at first selects a disengaged correcting network KN which is adapted for correction of phase distortion upon data transmission in carrier frequency channels of the kind to which the channel equipment FUR is pertaining. The marker then connects the line LD to the input side of the correcting network by means of a first communication through the selecting means VN and connects thereafter the output side of the correcting network to the channel equipment FUR by means of a second communication through the selecting means VN. After this the register is disconnected and data signals can be transmitted from the sender DU through the line LD, the selecting means VN, the correcting network KN, again through the selecting means VN to the channel equipment FUR.

Figure 2:
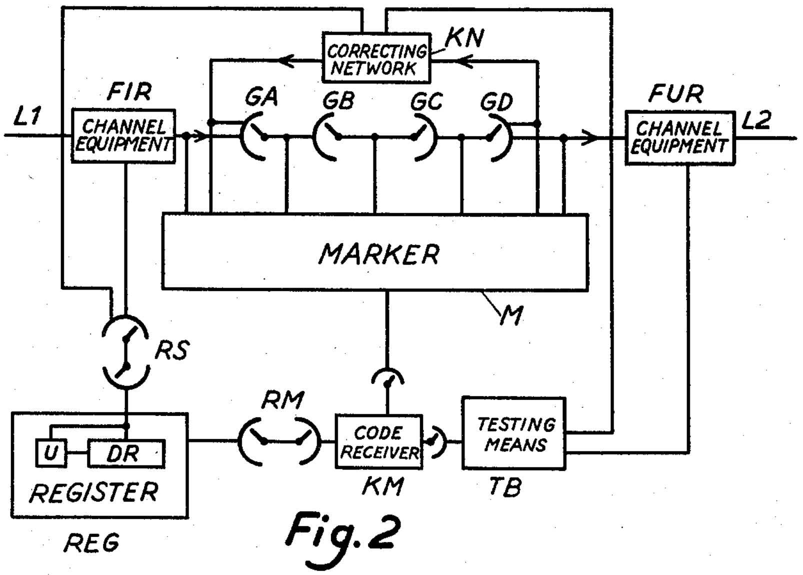
FIG. 2 shows the invention applied to an intermediate exchange having crossbar switches.

In FIG. 2 L1 and L2 are carrier frequency lines or radio relay links and FIR and FUR are speech channel equipments for an incoming and an outgoing channel, respectively. Four selecting stages GA, GB, GC and GD are operated from one or more markers M and connect incoming lines and channels with the outgoing lines and channels. A number of correcting networks KN having each an input side and an output side are with the input side connected to the selecting stage GD and with the output side connected to the selecting stage GA. The incoming speech channels can be connected through register finders RS to registers REG. The registers REG are in their turn connected through finders RM to one code receiver out of a number of code receivers, which code receiver co-operates with testing means TB and the markers M. The registers REG comprise registering means DR for digit signals and U for signals which show that the communication refers to data transmission.

A call coming in through the channel FIR is connected through the selectors RS to a register REG. Here it is supposed that the call refers to a communication for data transmission. Signals through the channel then set as well the registering means DR in order to indicate a called traffic direction as the registering means U in order to indicate that data transmission is intended.

The register REG then connects itself through the selectors RM to a code receiver KM which receives and translates the registering in U. A testing means TB is connected and selects a correcting network KN. Then KM connects itself to a marker M and transmits statements to the marker as to the identity of the calling channel FIR and to that of the selected correcting network KN. The identifying of FIR is supposed to be carried out through reading of the position of the selectors RS. The marker then connects the channel FIR through the selectors GA, GB, GC and GD to the incoming side of KN. The marker M like the code receiver KM and the testing means TB are released, while the register REG is maintained operated in order to complete the communication to the called traffic direction. Relay means pertaining to the correcting network KN are operated and connect the output side of KN through selectors RS to a second register REG which receives signals from the first register through KN. These signals indicate the number of the called traffic direction registered in DR and are now registered in the new register. The registering means U in the new register is not operated. The last mentioned register connects itself through the selectors RM to a code receiver KM which is now set according to the registering in the registering means DR of the register. After the registering has been translated, KM is connected to a testing means TB which selects a disengaged channel FUR. A marker M is connected and receives signals which indicate as well the correcting network KN as the selected channel FUR, after which the marker interconnects the output side of KN with the channel FUR through the selectors GA, GB, GC and GD. The cooperation of the two registers REG can be arranged in different ways. Here it is supposed that the first register transmits its setting to the later connected register and then is disconnected, after which the later connected register finishes the communication to the called channel FUR and not until then is disconnected. After this one communication is set up within the telephone exchange in FIG. 2 from the calling exchange FIR through the selecting means GA–GD, through a correcting network KN, and a second communication through the selecting means GA–GD to the channel FUR.

I claim:

An exchange in an automatic telehpone system for selective speech and data transmission over channels connected thereto, comprising selecting means for connecting calling channels to called channels, a register, a marker, a correcting network for correcting phase distortion in data transmission and having an input and an output, the input being connected as called channel and the output as calling channel to said selecting means, and means for identifying a calling channel and transmitting numercial signals to said register and said marker in response thereto, said marker responding to said numerical signals by setting up a communication through said selecting means and said register between said calling channel and a called channel, a separate signal indicating whether the calling channel is carrying data transmission or speech transmission, said marker further responding to an indication by said separate signal that data transmission is on said calling channel by selectively connecting said calling channel through said selecting means to said input of said correcting network and by connecting the said output of said correcting network through said selecting means to said called channel.

References Cited by the Examiner

UNITED STATES PATENTS

| | | | |
|---|---|---|---|
| 2,102,138 | 12/37 | Strieby | 179—165.31 |
| 2,881,251 | 4/59 | Strip | 178—2 |

DAVID G. REDINBAUGH, *Primary Examiner.*

L. MILLER ANDRUS, *Examiner.*